(12) United States Patent
Marti et al.

(10) Patent No.: US 7,684,020 B1
(45) Date of Patent: Mar. 23, 2010

(54) SENSOR SYSTEM AND METHOD FOR DETECTING AND IDENTIFYING RAPIDLY MOVING OBJECTS

(75) Inventors: Jed Marti, Salt Lake City, UT (US); Keith Brendley, McLean, VA (US)

(73) Assignee: Artis, LLC, Herndon, VA (US)

( * ) Notice: Subject to any disclaimer, the term of this patent is extended or adjusted under 35 U.S.C. 154(b) by 0 days.

(21) Appl. No.: 11/470,062

(22) Filed: Sep. 5, 2006

Related U.S. Application Data

(60) Provisional application No. 60/713,372, filed on Sep. 2, 2005.

(51) Int. Cl.
*G01P 3/36* (2006.01)
(52) U.S. Cl. .................................... 356/28; 356/28.5
(58) Field of Classification Search .............. 356/28, 356/3.01–3.15, 4.01–4.1, 5.01–5.15, 6–22, 356/28.5
See application file for complete search history.

(56) References Cited

U.S. PATENT DOCUMENTS

| | | | | |
|---|---|---|---|---|
| 4,864,515 A | * | 9/1989 | Deck ........................ 702/142 |
| 5,379,966 A | * | 1/1995 | Simeone et al. ............ 244/3.11 |
| 5,574,458 A | * | 11/1996 | Tran ............................ 342/13 |
| 6,414,747 B1 | * | 7/2002 | Hardy ......................... 356/28 |
| 2007/0206177 A1 | * | 9/2007 | Anschel et al. ............... 356/28 |

* cited by examiner

*Primary Examiner*—Thomas H Tarcza
*Assistant Examiner*—Luke D Ratcliffe
(74) *Attorney, Agent, or Firm*—Nixon & Vanderhye PC

(57) ABSTRACT

A relatively low-cost sensor can accurately detect, identify and track rapidly moving objects such as missiles, rocket propelled grenades (RPGs), mortars, explosive-driven fragments, bullets, shells, sports projectiles (baseballs, golf balls, tennis balls, arrows, etc.), and other types of objects. Systems that would incorporate such a sensor include military devices such as Active Protection System (APS), warning sensor systems, counter-fire systems; commercial devices such as an accurate baseball strike zone monitor, tennis ball line monitors, and arrow speed and flight characteristics monitors. The optical sensing system detects, identifies and tracks rapidly moving objects. The system is designed to be low-cost, rugged, highly reliable, and have a low False Alarm Rate (FAR). The system can accurately record signals from rapidly moving targets and then process this information with sufficient time to send a firing signal or take other action as appropriate.

20 Claims, 8 Drawing Sheets

Schematic of Exemplary System

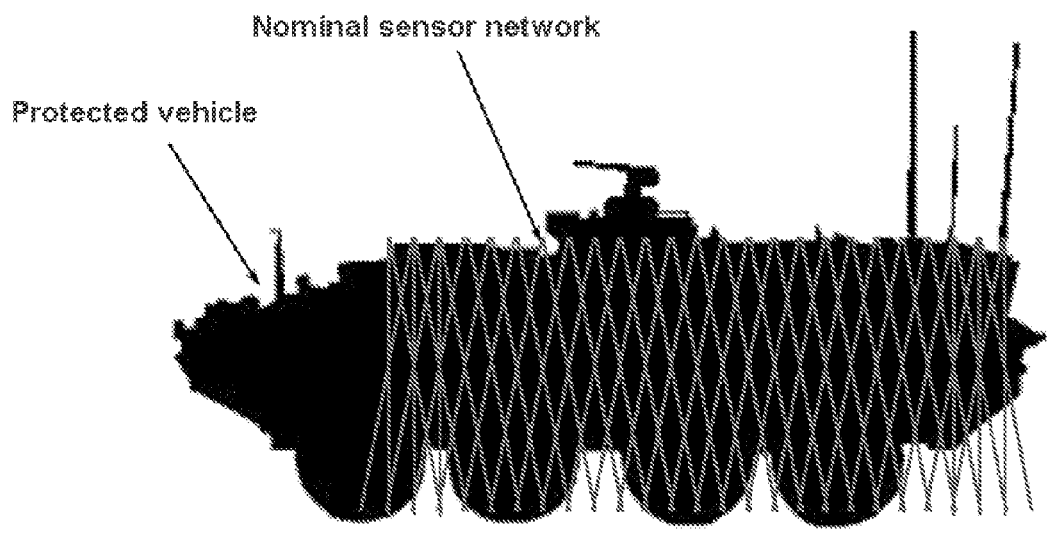
Figure 1: Sensor Pattern Juxtaposed Against Armored Vehicle
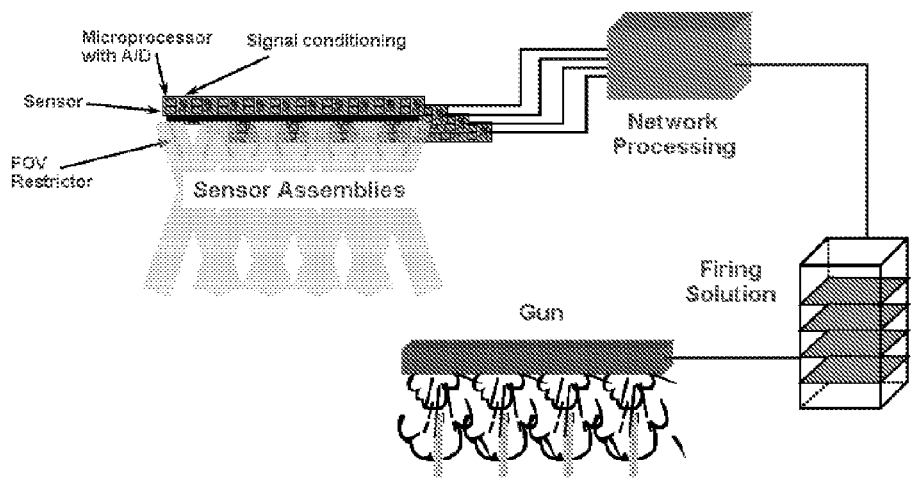
Figure 2: Schematic of Exemplary System

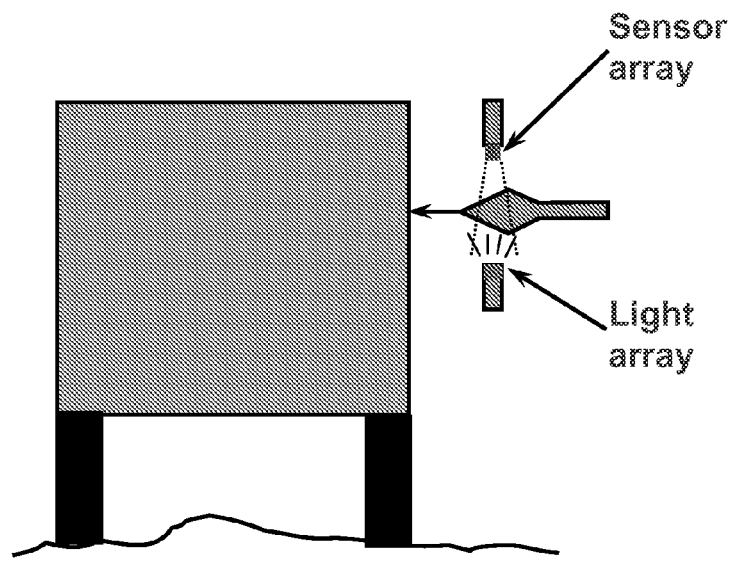
Figure 3: Exemplary configuration for REBAR
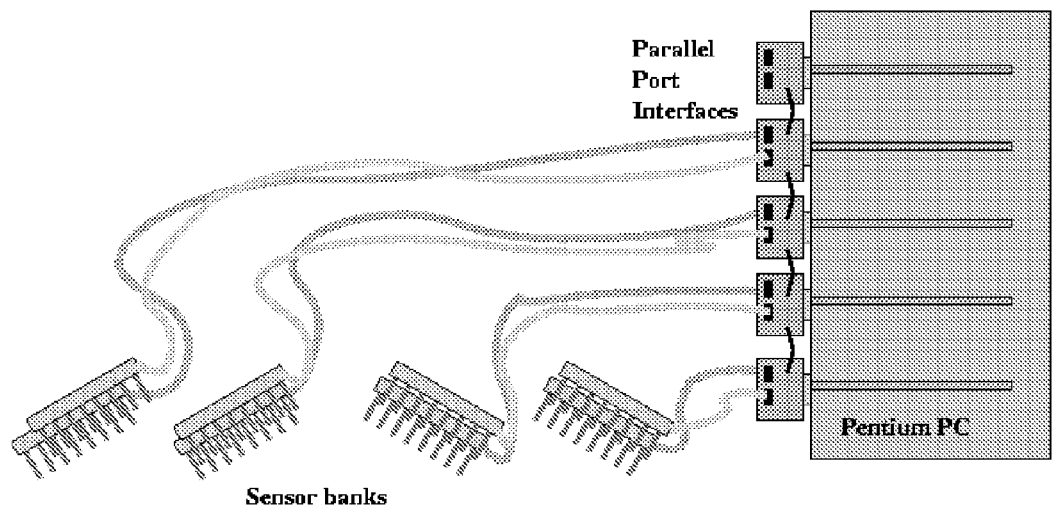
Figure 4: Exemplary electronics overview

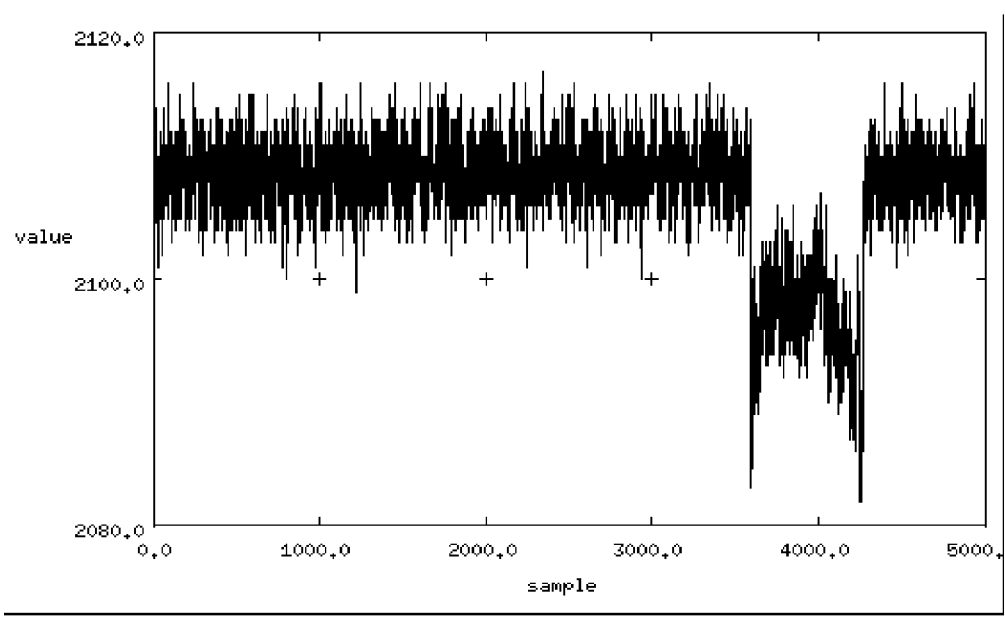
Figure 5: RPG Surrogate Traveling Over Concrete Background

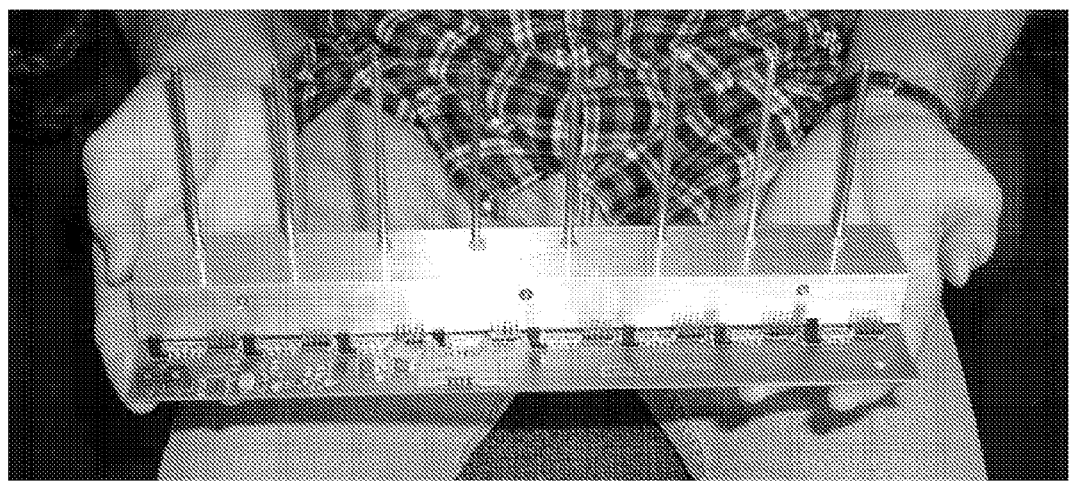
Figure 6: Exemplary Sensor Back Assembly
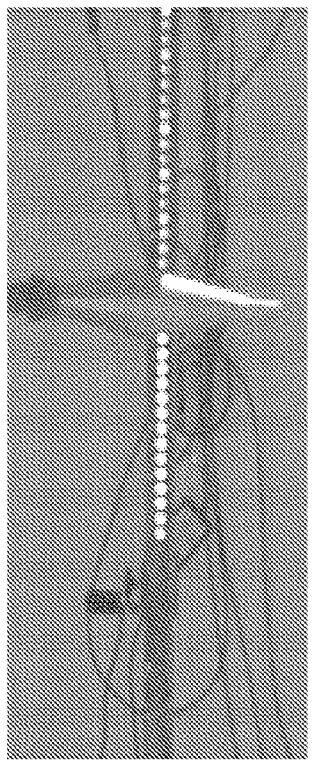
Figure 7: Exemplary RTTC Virtual Gun

Figure 8: Nomadics Gun Firing at an RPG7
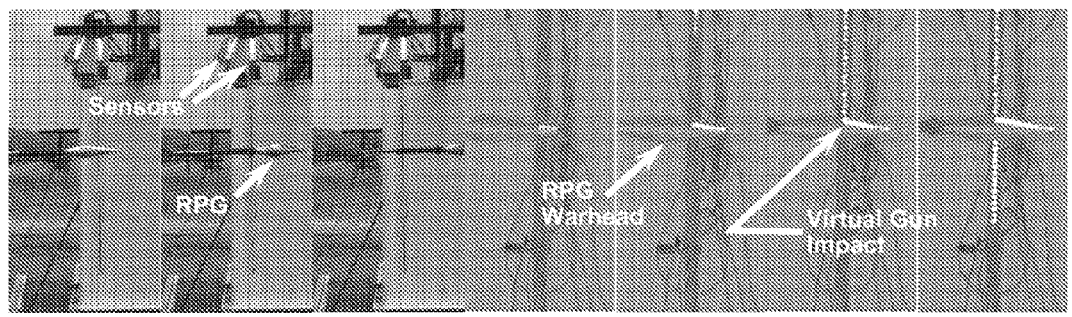
Figure 9: Photographic Series Taken by High-Speed Camera of RPG Flying Beneath Sensor and Being Intercepted by Virtual Gun

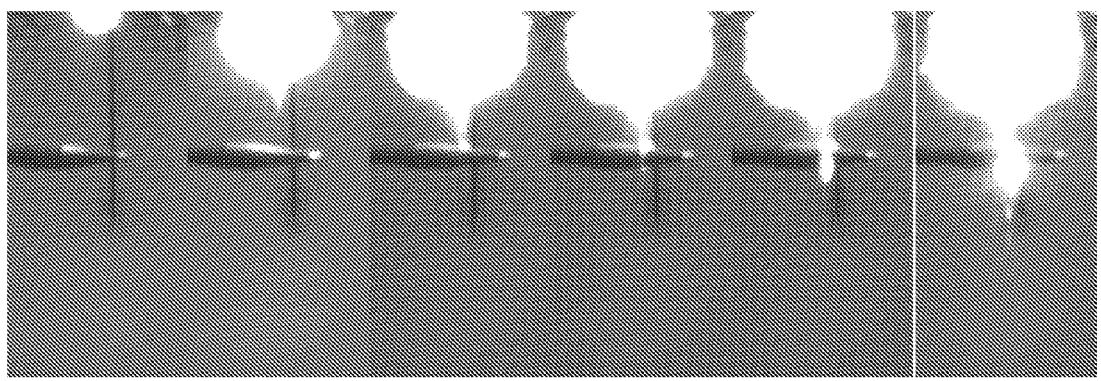
Figure 10: Photographic Series of Gun Triggered by System That Hits RPG In Flight
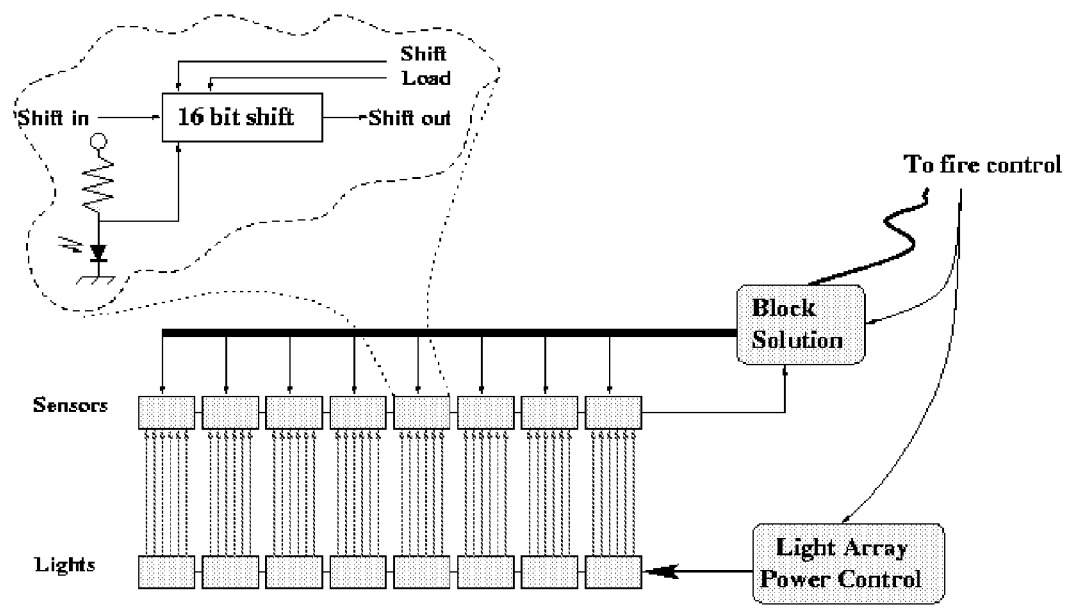
Figure 11: Exemplary Emissive Components.

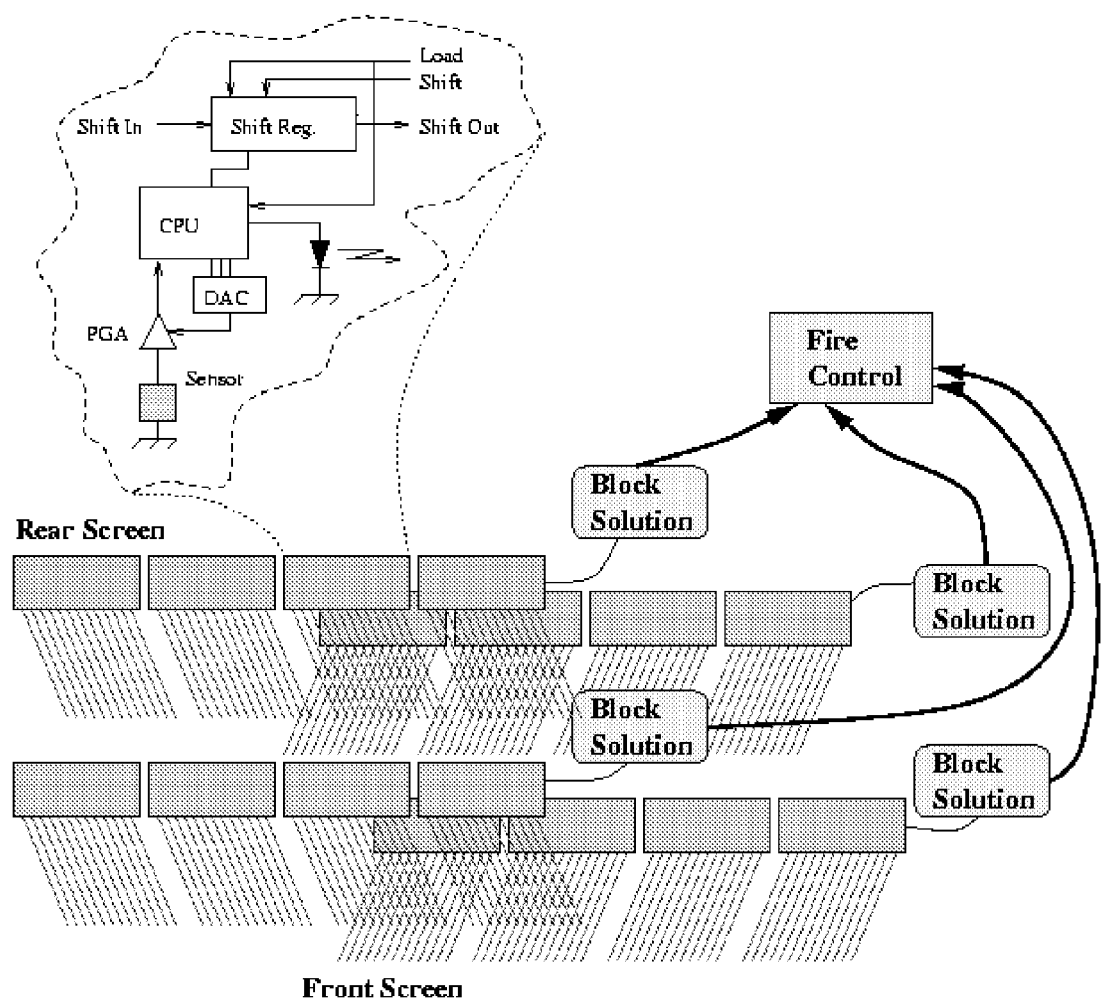
Figure 12. Exemplary Reflective Organization.

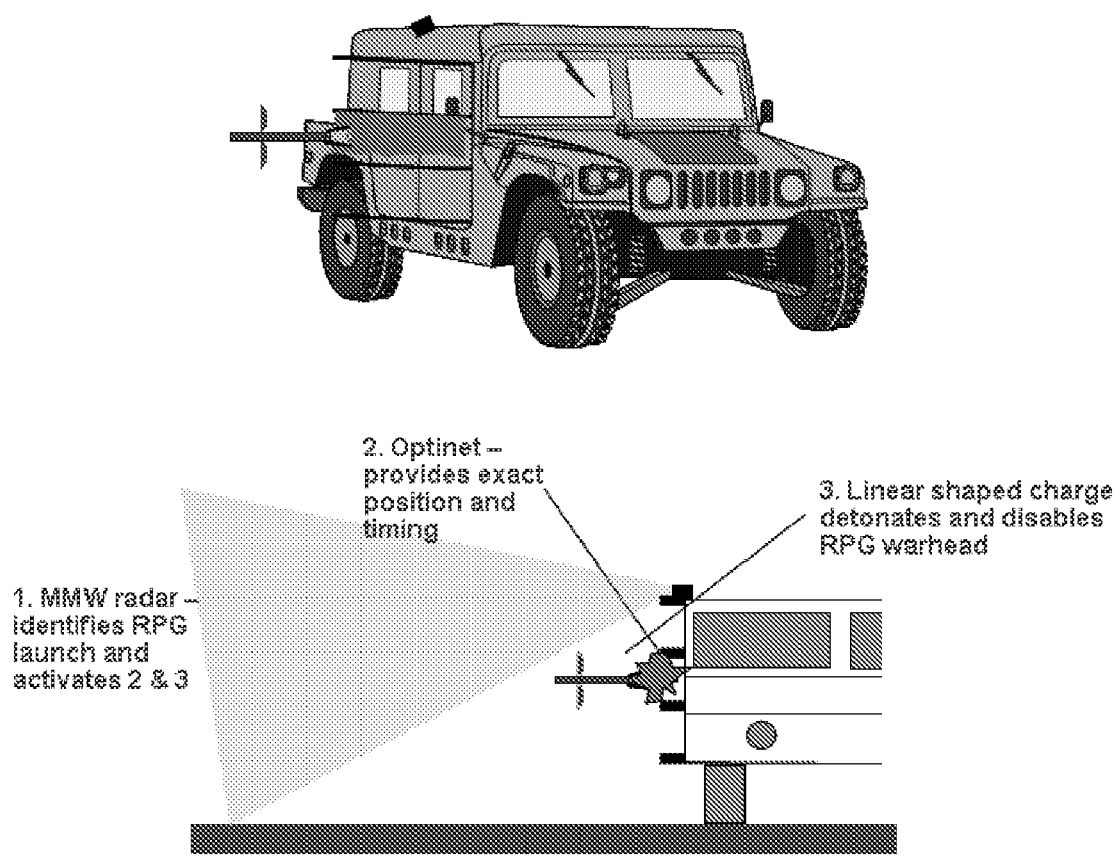
Figure 13: Reactive Bar Armor Schematic

SENSOR SYSTEM AND METHOD FOR DETECTING AND IDENTIFYING RAPIDLY MOVING OBJECTS

CROSS-REFERENCES TO RELATED APPLICATIONS

This application claims the benefit of priority from provisional application No. 60/713,372 filed Sep. 2, 2005, incorporated herein by reference.

FIELD

The technology herein relates to object sensing and tracking, and more particularly to reliably detecting and sensing rapidly moving objects.

BACKGROUND AND SUMMARY

There is a need for a relatively low-cost sensor that can accurately detect, identify and track rapidly moving objects such as missiles, rocket propelled grenades (RPGs), mortars, explosive-driven fragments, bullets, shells, sports projectiles (baseballs, golf balls, tennis balls, arrows, etc.), and other types of objects. Systems that would incorporate such a sensor include military devices such as Active Protection System (APS), warning sensor systems, counter-fire systems; commercial devices such as an accurate baseball strike zone monitor, tennis ball line monitors, and arrow speed and flight characteristics monitors.

The technology herein provides an optical sensing system for detecting, identifying and tracking rapidly moving objects. The system is designed to be low-cost, rugged, highly reliable, and have a low False Alarm Rate (FAR). The system can accurately record signals from rapidly moving targets and then process this information with sufficient time to send a firing signal or take other action as appropriate.

An illustrative non-limiting Reactive Bar Armor (REBAR) system illustrates types of technologies that may apply to a low-cost APS. REBAR could conceivably increase the probability of defeating threats, expand the set of threats addressed by the armor, decrease the weight imposed by what is typically an appliqué, and work in harsh environments. The system could potentially be sufficiently low cost to mount on HMMWVs and trucks, and it is therefore an attractive candidate for illustrating the types of systems that could be implemented

BRIEF DESCRIPTION OF THE DRAWINGS

These and other non-limiting features and advantages will be better appreciated by reviewing the following detailed description of exemplary illustrative non-limiting implementations in connection with the drawings, of which:

FIG. 1 shows an exemplary illustrative non-limiting sensor pattern juxtaposed against an armored vehicle;

FIG. 2 is a schematic diagram of an exemplary illustrative non-limiting system;

FIG. 3 shows an exemplary REBAR configuration;

FIG. 4 shows an exemplary electronics overview;

FIG. 5 shows a graph of an exemplary RPG surrogate traveling over concrete;

FIG. 6 shows an exemplary sensor back assembly;

FIG. 7 shows an exemplary RTTC virtual gun;

FIG. 8 shows a NOMADICS gun firing at an RPG7;

FIG. 9 are photos from a high speed camera of an intercepted RPG;

FIG. 10 shows a triggered gun intercepting an RPG in flight;

FIG. 11 shows an exemplary illustrative non-limiting emissive system;

FIG. 12 shows an exemplary illustrative non-limiting reflective system; and

FIG. 13 shows an exemplary reflective bar armor system.

DETAILED DESCRIPTION OF EXEMPLARY NON-LIMITING ILLUSTRATIVE IMPLEMENTATIONS

One exemplary approach is an emissive system that provides an illumination source, and where the missile or other object passes between the sensor array and illumination thus occluding the sensors. A potentially more complex reflective system senses a high-speed change in background contrast for its detection. It may also be provided with artificial illumination, but in this case, the light would be reflected from the target. Other exemplary systems employ both techniques.

One exemplary illustrative non-limiting implementation provides a network of optical sensors. The sensors may be standard, commercial photodiodes, although other types of sensors are possible. Each sensor scans for very rapid changes in luminosity or other sensed phenomenon. When a change with the correct characteristics is detected, it is spatially correlated with change detections at other sensors to determine if the pattern is compatible with a projectile or other object. Spatial accuracy is a function of sensor numbers, placement and orientation. Each sensor has a greatly restricted field of view so that it is sensing essentially along a line. Sensing lines can be formed into many different patterns depending upon the system requirements. In one exemplary illustrative implementation, the sensors discriminate only objects moving at high speed and ignore objects moving at lower velocities.

In FIG. 1, for example, the vertical position of a projectile or other object is obtained. In this example implementation, the sensors are formed into a crosshatch pattern. Other patterns are possible. For other applications where the vertical position is not needed, the sensors can be lined up looking in a single direction. In other applications, where the speed of the incoming object may be known via other means, two planes of sensors, each looking in a single direction but with each plane oriented at a different angle, may be used to calculated both vertical and horizontal location.

A schematic of one possible exemplary illustrative non-limiting instantiation is shown in FIG. 2. A row of optoelectric sensors is mounted on a printed circuit board with microprocessor, ND converters and other digital and analog electronics. Signals from these sensors are cascaded through a series of network processes until arriving at a central processor, which calculates the firing solution or other action. At the calculated time, a trigger signal is sent from the firing control computer to the appropriate countermeasure.

The exemplary illustrative system geometry envisioned for an exemplary illustrative non-limiting Reactive Bar Armor (REBAR) system is shown in FIG. 3. In this example implementation, the sensor array is positioned on a bar within a bar armor set. An array of emitters is positioned opposite it on a neighboring bar. The sensor set operates as a break screen as the light array provides a very high signal to noise ratio not possible with at least certain reflective systems. The system watches one or more blocks of interrupted sensors; that which meets a threat profile and corresponds with information coming from MMW radar causes a signal to be sent to the fire control system, where the appropriate response and timing are computed and the countermeasure fired.

Sensor geometry parameters of interest include spacing from emitters to sensor, sensor spacing density and sensor field of view. A typical sensor density can be about 1 per centimeter but other densities are possible. In the time domain, the sensor sampling rate is of interest. The countermeasure's time of flight and accuracy requirements may require reduced spacing to optionally provide at least a low resolution vertical capability.

Exemplary illustrative non-limiting system electronics shown in FIG. 4 consist of the following main components:
1. Sensor banks
2. Parallel port interfaces.
3. Personal computer or other computing device.
4. Software control.

In general, the signal to noise ratio for an RPG head traveling through the sensor field is large, as can be seen in FIG. 5. Here, a dull green RPG head is traveling over concrete that has been illuminated by a DC lamp in the laboratory.

An exemplary sensor block and its associated hardware for an exemplary illustrative non-limiting implementation are shown in FIG. 6. The 10 pin headers are for programming the CPU which is hidden by the aluminum block that covers the sensors. The grey socket in the middle provides sensor data to the host processor parallel port. Two small sockets on the left provide power.

The sensor may be connected to an RTTC Virtual Gun (Vgun) or a Nomadics gun array or any other device. The Vgun is shown in FIG. 7, captured during operations by a high speed (40,000 frames per sec) camera. The Vgun is comprised of a row of bright LEDs that are turned on in sequence to represent the position of a bullet in flight. Use of the Vgun with high speed photography permits the likely impact point of a bullet array to be measured.

The Nomadics gun shoots a linear array of bullets simultaneously in a plane perpendicular to the missile line of flight. While the gun is designed to shoot 72 bullets per linear meter, there may be some mechanical difficulties with the gun. This can make the effect of a fully functioning shot difficult to observe. Nevertheless, the gun may perform adequately to test the performance and to demonstrate at least one type of missile kill mechanism. FIG. 8 shows the Nomadics gun triggered by the system sensor in the vicinity of an RPG-7 missile.

Exemplary non-limiting configurations are reported below:

| LUX | Gun | Result | Travel Time (μsec) | Notes |
| --- | --- | --- | --- | --- |
| 9,000-12,000 | Vgun | MISS | 2420 | Velocity and positioning computation had bugs. |
| 100,000+ | Vgun | MISS | 4649 | The sun saturated many of the sensors and triggered the front row. |
| 100,000+ | Vgun | HIT | 1982 | Velocity 136.92 m/s, virtual gun hits just in front of aim point. |
| 100,000+ | Vgun | HIT | 2347 | Velocity 113.51, hits just behind aim point. |
| 78,000+ | Nomadics | HIT | | Successfully destroyed warhead. |
| | Nomadics | HIT | | Gun partly fires, hits target but missile still detonates. |

A series of photos from two cameras is shown in FIG. 9. The first 3 frames show an RPG with an inert warhead moving beneath the sensor. This sensor then triggers the Vgun, which is shown in the four subsequent frames. Note that the Vgun impacts the RPG in the ogive, just in front of the warhead section.

The sensor may trigger the Nomadics gun with good results. In some cases, the warhead is destroyed. In other cases, the gun may fire an insufficient number of rounds to destroy the warhead though at least one and possibly two bullets may hit the RPG near the aimpoint. The RPG may travel for example at 140 meters per second, which is half the maximum speed on an RPG7. Other speeds are possible Exemplary Emissive System FIG. 11 provides an overview of an exemplary illustrative non-limiting emissive system. An array of near-infrared (NIR) LED's illuminates a set of sensors. These are constructed in blocks of 8 or 16 with a spacing of between 5 and 10 millimeters. In one example implementation, these LED's are turned on only when alerted by the fire control computer as signaled by the MMW radar. Through an optical filter, the sensors in one implementation are sensitive to only the wavelength of the emitters and hence can have a high signal to noise ratio. The sensors are connected to a shift register that can load the values in all sensors and then shift those values to the solution computer at a high rate of speed. The block solution module finds the start and end measurements of an area occluded by a missile or other object. These are passed to the fire control computer for computation of the firing solution.

Assuming 256 sensors and a basic cycle time of 10 microseconds (an RPG can travel about 3 millimeters in this time at its highest rate of speed) and a 20 nanosecond register load time, we have about 40 nanoseconds for each shift, which is well within the range of most discrete logic shift registers.

The Block Solution computer in one exemplary illustrative non-limiting implementation provides these shift pulses, the load pulse and computation of the start and end points of an occluded area. These occluded areas are sent as two 8-bit numbers to the fire control computer. This computer decides which of one or more occluded areas is the target, decides when to fire, and which of the charge blocks to fire. The fire control computer should preferably have sufficient computing power and speed to isolate the appropriate occluded area and time the firing sequence within a few microseconds.

Because there is no vertical range information, this approach has a limited vertical separation determined largely by the speed of the missile, speed of the countermeasure and size of the target.

Exemplary Reflective System

Another exemplary illustrative non-limiting reflective approach does not use the two bars and has less of a requirement for range and speed information from the MMW radar. As shown in FIG. 15, this exemplary implementation comprises two optical screens each composed of two sets of sensors that cross in the defensive area. The system computes the RPG or other object speed and angle from the arrival times and X-Y position from each screen. The fire control system then computes and times the defensive measure.

It is not required that the sensed lines cross as shown in FIG. 12. For example, if the speed of the incoming object as already known (such as would be given by a radar), then one may use two screens looking at different angles relative to the direction of travel of the projectile to calculate vertical position.

Like the emissive system, the reflective sensors are built in blocks of 8 or 16, but with greater spacing (20 to 40 millimeters). Each sensor set has its own block solution computer connected to fire control. Since the signal to noise ratio is less than the emissive solution, each sensor is somewhat more complex. When the MMW radar warning arrives (10 milliseconds before RPG arrival), the system measures the amount of light arriving at the sensor and through a programmable gain amplifier, adjusts the gain up or down to achieve the best ratio. If there is insufficient light, such as at night or in deep shadows, the processor may turn on a near IR LED to illuminate the arriving warhead. The micro-controller looks for a rapid change in sensed light, either more or less, that signals the RPG arrival. Rapid change is signaled by setting a single bit in the shift register as in the emissive scheme. The block computer uses these to set the start and end ranges for the warhead.

The fire control computer first decides which blocks are a warhead and then computes the X and Y position from the intersection of the two sets for the screen. This is done for both the front and back screens. The difference in arrival time and angles determines speed and where and when the defensive mechanism will reach it.

Since many hundreds of low cost micro-controllers are used to operate this system, programming them during the debugging cycle may require special care. All micro-controllers can be connected by an I$^2$C bus or other type of bus and program loader developed for a multi-processor sensor net. In this exemplary system, blocks of up to 127 processors can be programmed at once, the whole process taking less than one minute.

Reactive Bar Armor

One Example Illustrative System

A schematic of an exemplary illustrative REBAR system is shown in FIG. 13. A warning sensor such as a MMW radar arms the system and provides gross speed, location and threat classification information. This activates the optical sensor and initiates the fire control process. In this exemplary configuration, the system is mounted on a bar and consists of a single row of photodiodes focused directly on a row of illuminating elements on an adjacent bar. Thus, as the RPG pass through the upper and lower bars it occludes the light source, and the system is presented with an extraordinarily high signal to noise ratio. With these data, it profiles the RPG to better identify it, establishes its speed and selects an aimpoint. This information is passed to a fire control system commanding a linear shaped charge to fire at the correct time to defeat the missile.

This is but one possible variant of the REBAR concept, which itself is but one possible APS concept. For example, the warning sensor could be an optical sensor, or given a sufficiently small FAR, it may be possible to forgo with the warning sensor altogether. A linear shaped charge was selected as the kill mechanism given the speed of the jet tip (typically about 3 km/sec); however, even greater speeds would be possible with an array of small, conical shaped charge elements, such as those used in the DPICM munition. Also, in a network-centric force that possesses other technologies, such as the Crosshairs system under development by DARPA, it may be possible to receive warning regarding incoming RPGs from other remote systems.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A threat countermeasure system for detecting a rapidly moving object and automatically deploying a countermeasure to respond to incoming threats, the system comprising:
    a radar that warns of an incoming projectile;
    an array of light emitting diodes illuminating an array of optical sensors, said array of optical sensors detecting light emitted by said light emitting diode array that is affected by projectiles passing between said light emitting diode array and said optical sensor array, said array of optical sensors scanning for very rapid changes in luminosity;
    at least one processor coupled to said optical sensor array, said processor receiving signals from said optical sensor array and being responsive to said radar warning, said processor distinguishing rapidly moving projectiles from objects moving at lower velocities at least in part based on said luminosity detected by said optical sensor array and spatial correlation of said detected changes in luminosity across said array of optical sensors, to determine if a sensed pattern is compatible with a projectile threat;
    wherein said at least one processor can discriminate very rapidly moving projectiles from slower moving objects at least in part from signals generated by many optical sensors in said array and compares said signals to determine whether detected objects constitute an incoming threat, and computes position of incoming projectiles at least in part in response to said spatial correlation; and
    a countermeasure deployment arrangement coupled to said at least one processor that automatically responds to incoming projectiles by commanding deployment of a countermeasure in time to defeat the projectile.

2. A method for detecting and profiling very rapidly moving projectiles comprising:
    receiving signals from an optical sensor array comprising many sensors each having a restricted, linear field of view, said sensors aimed to provide a cross-hatch pattern;
    discriminating very rapidly moving projectiles based on from signals generated by many sensors in said array including comparing said signals to determine whether detected objects meet a profile by spatially correlating detected changes in luminosity across said optical sensor array to determine if a pattern is compatible with a projectile threat; and
    generating fire control signals at least in part in response to said discrimination and said comparing to command a firing of a countermeasure in time to defeat the projectile.

3. The system of claim 1 wherein said radar provides additional sensing, and said system compares signals from at least one block of interrupted sensors with a threat profile and automatically generates a fire control command to fire a countermeasure at least in part in response to said comparison and said radar sensing.

4. The method of claim 2 further including sensing objects using radar, comparing signals from at least one block of interrupted sensors with a threat profile, and automatically firing a countermeasure at least in part in response to said comparing and said radar sensing.

5. The system of claim 1 wherein said projectile comprises a rocket propelled grenade.

6. The system of claim 1 wherein said at least one processor records signals from rapidly moving projectiles and processes said information in sufficient time to send a firing signal to said countermeasure deployment arrangement.

7. The system of claim 1 wherein each of said optical sensors in said array exhibits a restricted field of view so that it senses along a line.

8. The system of claim 1 wherein said sensors are formed in a cross-hatch pattern.

9. The system of claim 1 wherein said optical sensor array comprises plural planes of sensors, the plural planes being oriented at different angles, and said at least one processor calculates both horizontal and vertical position of an incoming projectile.

10. The system of claim 1 wherein said optical sensor array is disposed on a bar within a bar armor set.

11. The system of claim 1 wherein said optical sensor array operates as a break screen.

12. The system of claim 1 wherein said optical sensor array has a sensor density of about one sensor per centimeter.

13. The system of claim 1 wherein said countermeasure comprises a linear array of bullets shot simultaneously in a plane perpendicular to the projectile line of flight.

14. The system of claim 1 wherein said optical sensor array is activated in response to radar warning.

15. The system of claim 1 wherein said optical sensor array includes filters that make the sensors sensitive substantially only to the wavelength emitted by the light emitting diodes.

16. The system of claim 1 wherein the array of optical sensors are coupled to at least one shift register that loads sensor values and shifts the loaded values to the processor at a high rate of speed.

17. The system of claim 1 wherein the optical sensor array has a cycle time of 10 microseconds or less.

18. The system of claim 1 wherein said at least one processor isolates an appropriate occluded area and times a countermeasure deployment sequence within a few microseconds.

19. The system of claim 1 wherein said system is disposed at least in part within reactive bar armor including upper and lower bars, the radar is used to arm the system and provide gross speed, location and threat classification information, and as a projectile passes between the upper and lower bars it occludes the light emitting diodes so the at least one processor detects projectile position with a high signal to noise ratio, and wherein the at least one processor profiles the projectile to better identify the projectile, determines projectile speed and selects an aimpoint for the countermeasure.

20. The method of claim 2 wherein said array is disposed at least in part within reactive bar armor including upper and lower bars, and the method includes using radar to arm and provide gross speed, location and threat classification information, a projectile passing between the upper and lower bars occluding light emitters on one of the bars to thereby allow detection of projectile position with a high signal to noise ratio, and the method further includes profiling the projectile to better identify the projectile, determining the speed of the projectile, and selecting an aimpoint for the countermeasure.

* * * * *

UNITED STATES PATENT AND TRADEMARK OFFICE
CERTIFICATE OF CORRECTION

| | | |
|---|---|---|
| PATENT NO. | : 7,684,020 B1 | Page 1 of 1 |
| APPLICATION NO. | : 11/470062 | |
| DATED | : March 23, 2010 | |
| INVENTOR(S) | : Jed Marti et al. | |

It is certified that error appears in the above-identified patent and that said Letters Patent is hereby corrected as shown below:

Specification

Column 1, before line 5, insert the following heading and paragraph:

-- STATEMENT REGARDING FEDERALLY SPONSORED RESEARCH OR DEVELOPMENT

This invention was made with United States Government support under Contract No. W911QX05D0011#C13 awarded by the United States Army. The Government has certain rights in the invention. --

Signed and Sealed this
Twenty-ninth Day of March, 2016

Michelle K. Lee
*Director of the United States Patent and Trademark Office*